(12) United States Patent
Hulett

(10) Patent No.: US 8,503,145 B2
(45) Date of Patent: Aug. 6, 2013

(54) FAULT PROTECTED CURRENT SOURCE FOR LIGHTING ELEMENT TESTING

(75) Inventor: Jeffery Neil Hulett, Encinitas, CA (US)

(73) Assignee: Vektrek Electronic Systems, Inc., San Diego, CA (US)

( * ) Notice: Subject to any disclaimer, the term of this patent is extended or adjusted under 35 U.S.C. 154(b) by 257 days.

(21) Appl. No.: 13/086,313

(22) Filed: Apr. 13, 2011

(65) Prior Publication Data
US 2011/0254530 A1 Oct. 20, 2011

Related U.S. Application Data

(60) Provisional application No. 61/282,870, filed on Apr. 14, 2010.

(51) Int. Cl.
*H02H 9/02* (2006.01)
*G05F 1/573* (2006.01)
*G05F 1/00* (2006.01)
*H05B 37/02* (2006.01)

(52) U.S. Cl.
USPC ........... 361/93.1; 323/282; 323/267; 315/294

(58) Field of Classification Search
USPC ................. 361/93.1; 323/282, 267; 315/294
See application file for complete search history.

(56) References Cited

U.S. PATENT DOCUMENTS

| | | | | |
|---|---|---|---|---|
| 7,986,108 | B2 * | 7/2011 | Yinn et al. | 315/297 |
| 8,228,005 | B2 * | 7/2012 | Ohtaka et al. | 315/307 |
| 2006/0082332 | A1 | 4/2006 | Ito et al. | |
| 2008/0278350 | A1 * | 11/2008 | Berkhahn et al. | 340/945 |
| 2009/0026977 | A1 | 1/2009 | Omi | |
| 2009/0195183 | A1 | 8/2009 | Yang | |
| 2009/0316743 | A1 * | 12/2009 | Alfrey | 372/38.04 |
| 2010/0156315 | A1 * | 6/2010 | Zhao et al. | 315/294 |

OTHER PUBLICATIONS

International Search Report for International App No. PCT/US2011/032528, mailed Oct. 6 2011.
SSP-Konstanter 32 N Series SSP 120, SSP 1-12, 240 and SSSP 320 Programmable Power Supplies, Dec. 4, 2005 pp. 1-92, Nurnberg, Germany.
MAX16834 High-Power LED Driver with Integrated High-Side LED Current Sense and PWM Dimming MOSFET Driver, May 1, 2009, pp. 1-23, Sunnyvale, CA, US.
Elektro-Automatik GmbH: PS 8000 DT Laboratory Power Supply Series, Jan. 1, 2009, pp. 1-38,Viersen, Germany.
Texas Instruments: TPS40210 4.5-V to 52-V Input Current Mode Boost Controller, Jun. 1, 2008, pp. 1-46, Dallas, Texas, US.

* cited by examiner

*Primary Examiner* — Scott Bauer
(74) *Attorney, Agent, or Firm* — Sheppard Mullin Richter & Hampton LLP

(57) ABSTRACT

A fault protected current source is provided that can be used to safely drive LEDs in reliability test systems. The current source is includes circuits and processes that detect the common faults found in LED reliability test systems. After a fault is detected, the current source shuts down drive before destructive spikes are produced. Because only true LED failures are counted, this fault protected current source can be used to construct reliability test systems that produce more accurate reliability test data.

29 Claims, 7 Drawing Sheets

FAULT PROTECTED CURRENT SOURCE FOR LIGHTING ELEMENT TESTING

CROSS-REFERENCE TO RELATED APPLICATIONS

This application the benefit of U.S. Provisional Application No. 61/282,870 filed Apr. 14, 2010, which is hereby incorporated herein by reference in its entirety.

TECHNICAL FIELD

The present invention relates generally to electrical testing equipment, and more particularly, some embodiments relate to current sources for semiconductor lighting elements.

DESCRIPTION OF THE RELATED ART

Reliability tests for light emitting diodes (LEDs) are often administered to assess the performance of the devices over time. These tests subject the LEDs to temperature and humidity levels that are elevated beyond normal operating points. These harsh conditions accelerate the normal aging process for the LED materials. This produces failures in a reasonable amount of time—typically in a few hundred to a few thousand hours of operation. Despite these measures, failure rates can still be low, and large numbers of devices must be tested to gather enough data to ensure a statistically significant conclusion.

The LEDs are often powered during the long term reliability tests by Direct Current (DC) or pulsing power sources called current sources. For testing, the current levels may be set above the device's normal operating level to increase stress on the LED. LED current sources are crucial components of reliability test systems. They must provide the correct level of drive current to the LEDs for the reliability test to operate for thousands of hours. While this might appear to call for only high-reliability circuit design, many real-world fault conditions can tax the current source during these marathon tests. If the current source responds to these faults by delivering too little current, the LEDs are driven at an incorrect, less stressful level. However, if, the current source responds by producing too much current, the LEDs will be over-stressed, reducing their life, and sometimes causing catastrophic failures. In either of these circumstances, the reliability test can be comprised or ruined, and the time invested in the test may be lost.

To minimize the number of current sources needed, the LEDs are often arranged in series circuits that are powered from a single current source. LEDs are mounted on load boards—circuit boards that provide the electrical connections to the LEDs. The load boards are affixed to thermal control platforms that remove the generated heat. FIG. 1 illustrates a schematic diagram for a typical load board with two series circuits of LEDs. Typically, each circuit is driven by its own constant or pulsed current source. The first circuit comprises a positive current input 102 and a negative input 103. A plurality of LEDs 104 are connected in series with the positive 102 and negative 103 inputs. In the illustrated load board, a voltage measurement connection 105 is provided between each pair of LEDs 104. The measurement connections 105 allow detection and isolation of LED faults of the type described below. Similarly, the second circuit comprises a positive current input 106, a negative current input 107, a plurality of LEDs 109 and a corresponding plurality of voltage measurement connections 109. A ground connection 108 provides a ground for the load board mounting platform 111.

Common LED reliability sys faults fall into four major categories: 1) Open Faults, 2) Shorting Faults, 3) Wiring Faults, and 4) Control Faults.

Open Faults typically occur within the LED. They halt current flow within the LED. If the open failure is temporary, the interruption will be brief and the LED will "flicker" off and on. During the off state, most current sources will drive the LED circuit voltage to the source's maximum compliance voltage—often tens of volts above the nominal voltage—in an attempt to force the current. When the connection is restored, this high voltage can drive excess current through the circuit, over-stressing the LEDs.

Shorting Faults also occur within the LED. Typically, a structure breaks down within the LED and current bypasses one or more internal LED junctions. The voltage across the device then collapses to a new lower level. At this point the current source must adjust rapidly to this new operating point. Even the highest bandwidth control loops typically cannot do this quickly enough to avoid a large current transient and damage to the LED. FIG. 2 shows a transient current from a typical 12 A current source caused by an LED shorting fault. Trace 201 illustrates the voltage across an LED device. The illustrated vertical scale is 5V per division. Trace 203 illustrates the current output of a typical current source. The illustrated vertical scale is 5 A per division. The common time scale is 10 ms per division. As illustrated, a shorting fault causing a rapid voltage drop 202 is typically accompanied by a large transient current increase 204, potentially damaging the LED further or other LEDs in the circuit.

Wiring Faults occur within the wiring or circuit board traces that convey current to the LED. The wiring conductors are normally insulated from nearby objects. If this insulation is breeched, current flows through an unintended path. Depending upon the path taken, various outcomes can result. If a short occurs to the LED mounting platform, which is often grounded, the fault can force the current to bypass current source regulating circuits. This results in unregulated currents that can be many times the normal level.

Control Faults occur when the control system that services the LED current source fails. Typical failures include loss of a communication link, such as an Ethernet or RS232 control link, loss of an internal power bus, or even a complete laboratory power failure. When these control faults occur, the current source is forced to run and/or shutdown autonomously. Like open faults, control faults can be intermittent, and sometimes the restoration of power or control can force a current source into an unintended mode in which current levels are undefined.

Existing current sources have some protection features for load faults such as programmable current or voltage limiting, but these protection features are generally intended to prevent fire, significant overload or other gross failures; they are typically not fast enough, sensitive enough, or comprehensive enough to prevent short-duration current transients and spikes. These short-duration spikes inevitably cause secondary LED failures—failures in LEDs that share common circuitry with the current source that suffered the initial fault. These secondary failures can, in turn, induce more failures. This domino-like failure process is sometimes not apparent, especially if the secondary damage is not severe enough to completely destroy the LED. Secondarily damaged LEDs are often counted as legitimate failures, degrading the reliability test results. Accordingly, many reliability systems produce incorrect results showing diminished LED reliability because of this process.

BRIEF SUMMARY OF EMBODIMENTS OF THE INVENTION

In various embodiments of the invention, a fault protected current source is provided that can be used to safely drive LEDs in reliability test systems. The current source is includes circuits and processes that detect the common faults found in LED reliability test systems. After a fault is detected, the current source shuts down drive current before destructive spikes are produced. Because only true LED failures are counted, this fault protected current source can be used to construct reliability test systems that produce more accurate reliability test data.

According to an embodiment of the invention, a fault protected current source, comprises a positive current output and a negative current output, a DC-DC converter configured to adjust a maximum output voltage for the current source in response to a control signal, an over current detection module configured to monitor the current, and a processor configured to monitor voltage, to provide the control signal to the dc-dc switching converter, and to provide the current level control signal to the over current detection module.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

The present invention is directed toward a fault protected constant current source for LED reliability testing. The fault protected current source preferably handles various common faults that occur in LED reliability systems, and prevents damaging current spikes that would otherwise produce secondary LED failures. Using this source, reliability test system designers can construct test systems that safely drive thousands of LEDs, and produce accurate reliability test results. The source may also be used to drive other sensitive devices that operate at steady states, such as for example, quantum cascade lasers, laser diodes, and laser diode stacks. In addition to reliability testing, other applications include device burn-in, device characterization, and device limit testing.

Figure 3:
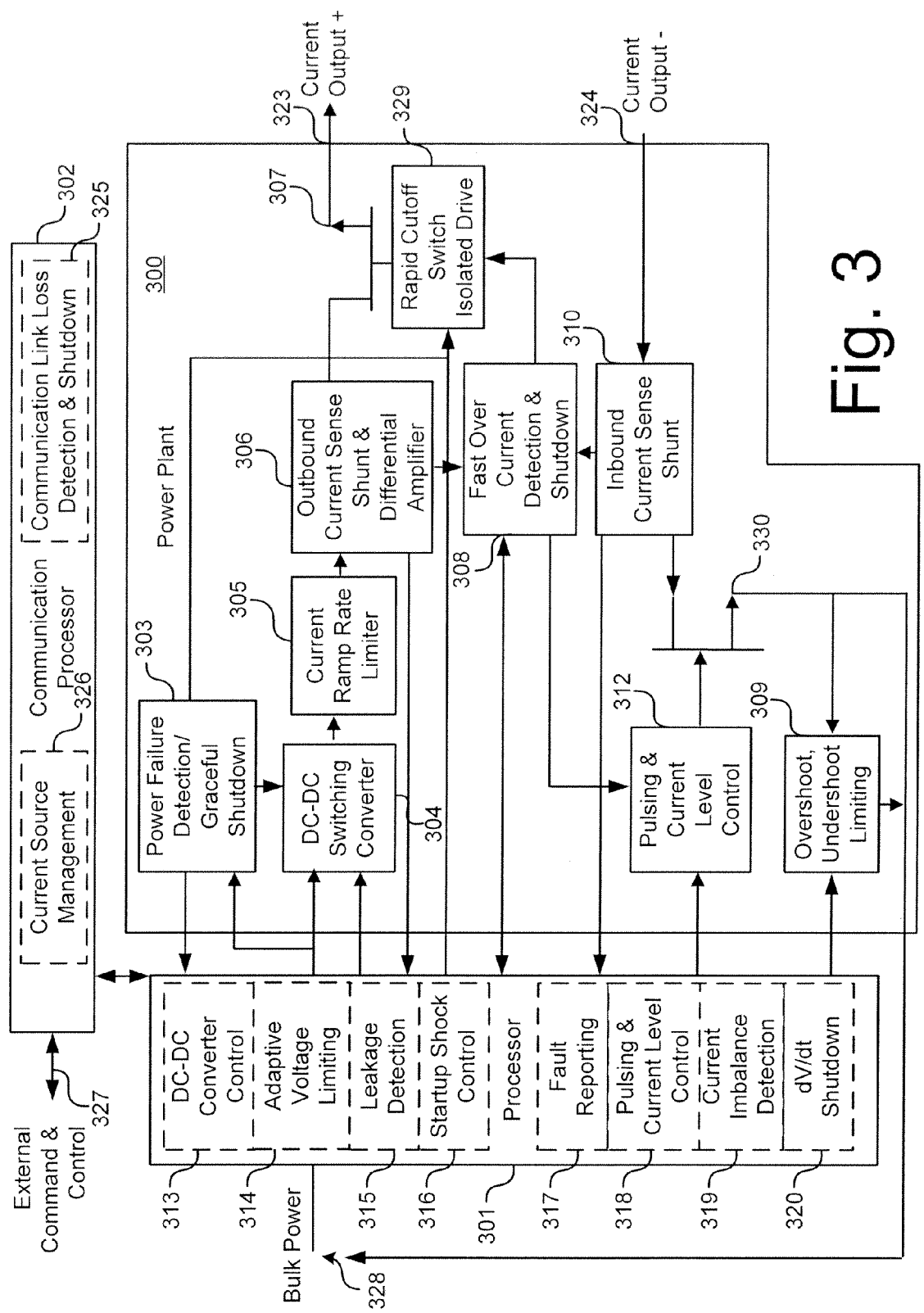
FIG. 3 illustrates a fault protected current source implemented in accordance with an embodiment of the invention.

FIG. 3 illustrates a fault protected current source implemented in accordance with an embodiment of the invention. The illustrated current source comprises a power plant 300, a processor 301, and a communication interface and processor 302. The power plant 300 adapts external bulk power 328 to provide the required constant current for powering a load circuit, such as a series circuit of LEDs. The communication processor 302 provides an external communication link to perform communication activities such as controlling the parameters of the current source and reporting faults. The processor 301 manages the fine, real-time or near real-time control of the power plant 300.

The power plant 300 controls both the positive current output terminal 323 and the negative current output terminal 324. Many common current sources regulate only one of the two terminals, assuming the other terminal will follow. This fails to protect against wiring faults that can result in current paths that bypass one of the terminals.

The positive current output 323 is controlled using a voltage converter 304, a rate limiter 305, and a rapid cutoff switch 307. The converter 304 may comprise a DC-DC switching converter, or other variable DC voltage regulator. The converter 304 regulates input power 328, which is typically bulk DC power, to adjust the maximum voltage for the current source. The converter 304 receives a control signal input from the processor 301 and sets the maximum voltage in response to the control signal. As described below, the maximum voltage is set by adaptive compliance voltage limiting 314 to a predetermined number of volts above the required steady-state output voltage. In one embodiment, the converter 304 comprises a DC-DC switching converter 304, where the output voltage is determined by pulse width modulation (PWM) of the switching network within the converter 304. A PWM signal may be provided directly to the converter 304 by the processor 301 as the control signal. For example, the processor 301 may comprise a digital signal processor (DSP) capable of directly outputting variable PWM signals. Alternatively, the processor 301 may provide another control signal that is used by the converter 304 to implement a PWM signal corresponding to the indicated voltage. The converter 304 outputs a constant voltage for the load circuit in response to the control signal provided by the processor 301.

Figure 2:
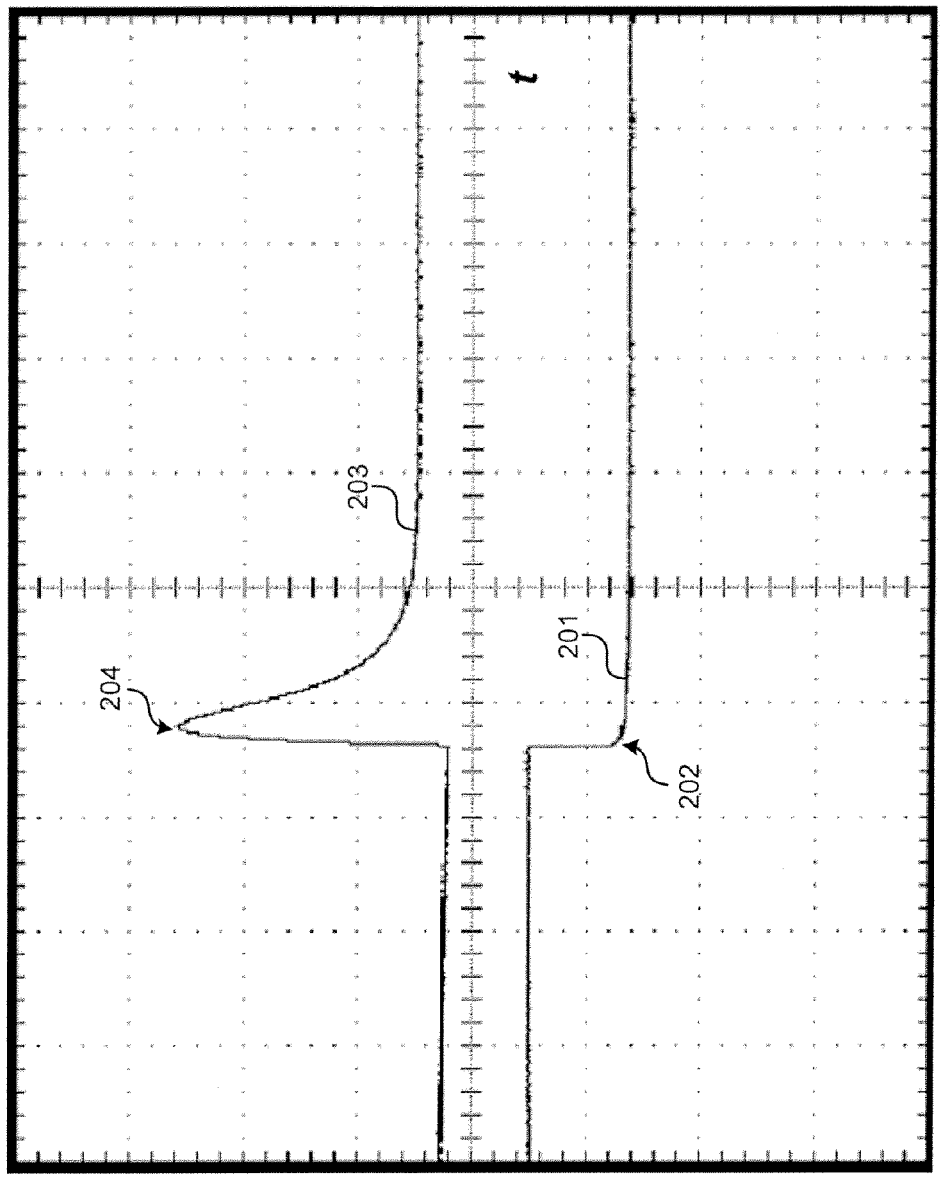
FIG. 2 shows a transient current from a typical 12 A current source caused by an LED shorting fault.

The load circuit draws current as needed from the converter 304 through the current ramp rate limiter 305. The current ramp rate limiter 305 prevents rapid changes in the current by current change to a predetermined number of amps per second. This provides time for the processor 301 and hardware modules in power plant 300 to adapt to changing current, limiting transient current spikes. With respect to FIG. 2, the effect of the current ramp rate limiter 305 is to reduce the slope of transient current spikes 204, providing time for rapid cutoff and adaptive current changes. The current ramp rate limiter 305 may be implemented using typical circuit elements, such as inductors. The current rate limit may be depend on the response times of other hardware elements, such as the rapid cut off circuits 307 or 311 described below.

In one embodiment, in a circuit testing a full 3.5V LED, the current ramp rate is limited to 2.9 A/microsecond.

The current then passes through an outbound current sense module 306. The outbound current sense module 306 measures the outbound current and provides the measured current to the processor 301 and the over current detection module 308 (described below). The outbound current sense module 306 may be implemented as a high-side current shunt that detects current values using a shunt resistor and differential amplifier.

The current then passes through the rapid cutoff switch 307. The rapid cutoff switch 307 is driven by a driver 329. The driver 329 is isolated from the current output 323. The driver 329 opens the switch 307 in the event that a fault is detected, isolating the positive current output terminal 323 from the supply 304. The switch driver 329 receives a control signal from the power failure detection module 303 and the over current detection and shutdown module 308, both described below. Implementation of on-board fault detection in these modules allows the rapid cutoff switch 307 to rapidly respond to faults, on the order of a few microseconds. In some embodiments, the switch 307 comprises a high power MOSFET driven with a high voltage gate drive.

Figure 1:
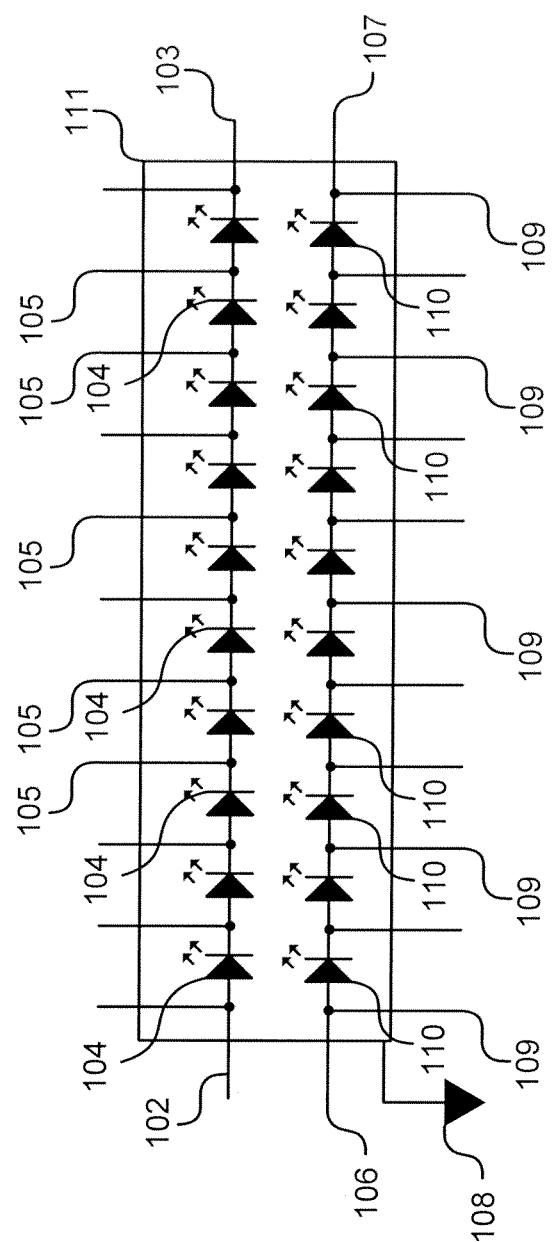
FIG. 1 illustrates a schematic diagram for a typical load board with two series circuits of LEDs.

Finally, the positive current is output to the load at output 323. The load may comprise series of LEDs, as illustrated with respect to FIG. 1, or other semiconductor lighting devices, such as quantum cascade lasers, laser diodes, and laser diode stacks. Voltage measurement connections 105 allow the processor 301 to measure voltage across individual lighting devices and across the load as a whole.

Returning current on the negative current output 324 passes through an inbound current sense module 310. The inbound current sense module 310 provides a measurement of the inbound current to the processor 301 and the over current detection module 308. The inbound current sense module 310 may be implemented as a low-side current shunt.

The current then passes through a second switch or regulator 330. Switch 330 is controlled by driver 312. In pulse-mode LED testing, driver 312 controls the pulse rate and current level of the load in response to control signals from the processor 301. The driver 312 and switch 330 regulates current and pulsing by varying the frequency and PWM of the switching control signal provided to the switch 330. Additionally, the driver 312 may be coupled to the over current detection module 308 to implement rapid current cutoff the event of an LED fault. In some embodiments the cutoff switch 307 and driver 329 may be omitted from the system and its functions performed solely by switch 330 and driver 312. Although this eliminates protection against some wiring faults, where the normal circuit ground is bypassed by a fault, it reduces circuit complexity in embodiments where such wiring faults are low-risk. In one embodiment, the switch 330 comprises a high power MOSFET driven with a high speed operational amplifier. In the default state, the MOSFET is driven by the amplifier in the linear region. In response to a fault, a low signal from the module 308 drives the operational amplifier to rail, driving the MOSFET out of the linear region and into the off state.

After switch 330, an overshoot and undershoot limiting module 309 dampens and filters the inbound current. The module 309 prevents negative current from occurring on the circuit. Such negative current may be otherwise present in pulsed mode operation, particularly over long cables. Negative current can damage LEDs, especially if they do not include internal reverse bias protection. The overshoot limiting aspect of module 309 is implemented by slowing down the response to current changes by overdamping the circuit.

In one embodiment, the undershoot is implemented by connecting the negative lead to ground with a capacitor. In some embodiments, the capacitance may be varied to provide various amounts of undershoot limiting. For example, various capacitors from a bank of capacitors may be switchably connected to the circuit to provide a variety of optional capacitances.

The power plant further comprises a power failure detection module 303 and a over current detection module 308. The power failure detection module 303 is coupled to the power plant's 300 internal bus and measures bulk power 328 and can signal the converter 304 and the switch driver 329. If the power drops below a nominal level, indicating a power loss, the module 303 reports to processor 301 and initiates a graceful shutdown. During a graceful shutdown, the power failure detection module 303 signals the driver 329 to open the rapid cutoff switch 307. The module 303 further signals the converter 304 to maintain or lower the maximum voltage limit set by the processor 301. This prevents the converter 304 from resetting to a large maximum voltage limit (such as a built-in maximum compliance voltage) in the event that the processor loses power 301. If power were quickly restored after a reset, a surge could occur. This is prevented by the power failure detection module 303. The power failure detection module 303 further monitors the bulk power levels 328 to determine if sufficient power is present for testing. If there is insufficient bulk power, the power failure detection module 303 reports a fault to the processor 301.

The over current detection module 308 is coupled to outbound current monitor 306 and inbound current monitor 310, is coupled to control the drivers 329 and 312, and is in communication with processor 301. The over current detection module 308 implements the current limit for the current source. It measures the outbound and return currents and compares them to control current levels provided by the processor 301. In one embodiment, the detection module 308 compares both the outbound current and the inbound current to a single control current level provided by the processor. In another embodiment, the processor provides an outbound control current level and an separate inbound control current level. In this embodiment, if either current is greater than the corresponding control level, a shutdown is initiated. In still further embodiments the current detection module 308 monitors only inbound current or only outbound current. Upon detection of an over current, the detection module 308 reports to the processor 301 and transmits a control signal to one or both of the drivers 329 and 312, to open switches 307 and 330, respectively. As discussed below, the control current levels are set by the processor to a predetermined number of milliamps above or a predetermined percentage of a nominal current level to create a threshold for over current. As further discussed below may be adjusted during operation, for example, during start-up procedures.

In addition to the power plant 300, the current source comprises the communications processor 302 and the processor 301. The communications processor 302 has a communication link 327 to an external source of command and control information. In some embodiments, the communications link may be implemented as a standard Ethernet connection. This command and control information can perform various functions, such as providing current source operating parameters, and controlling start up and shut down of the current source. The processor 328 performs current source management 326 to interpret and forward command and control information to the processor 301 and to report information received from the processor 301 to the external control source. In the illustrated embodiment, the communication processor 302 is further configured to detect a communication link loss and implement a power plant shut down if loss occurs 325. In typical control interfaces, if the communication link is lost, the power supply may continue to operate, potentially overstressing the test system or creating undetected faults. In some embodiments, a shut down is implemented immediately after a communication link loss. In other embodiments, the communications processor 302 waits for a predetermined amount of time such as 2 min, before shutting down to allow a time for reestablishment of the communication link.

The processor 301 interfaces with the power plant 300 and the communications processor 302. The processor 301 performs real-time control of the power plant 300 to implement the control instructions received from the communications processor 302. It also controls the pulsing rate and current level of the source and performs various automatic fault prevention procedures, to implement these functions, it receives monitoring and status information and from the hardware fault logic, current sensing circuitry, and voltage sensing circuitry of power plant 300 and any attached load. The processor 301 also performs fault reporting 317 to relay detected faults to the communications processor. In some embodiments, the processor 301 may be implemented using a digital signal processor (DSP).

Figure 4:
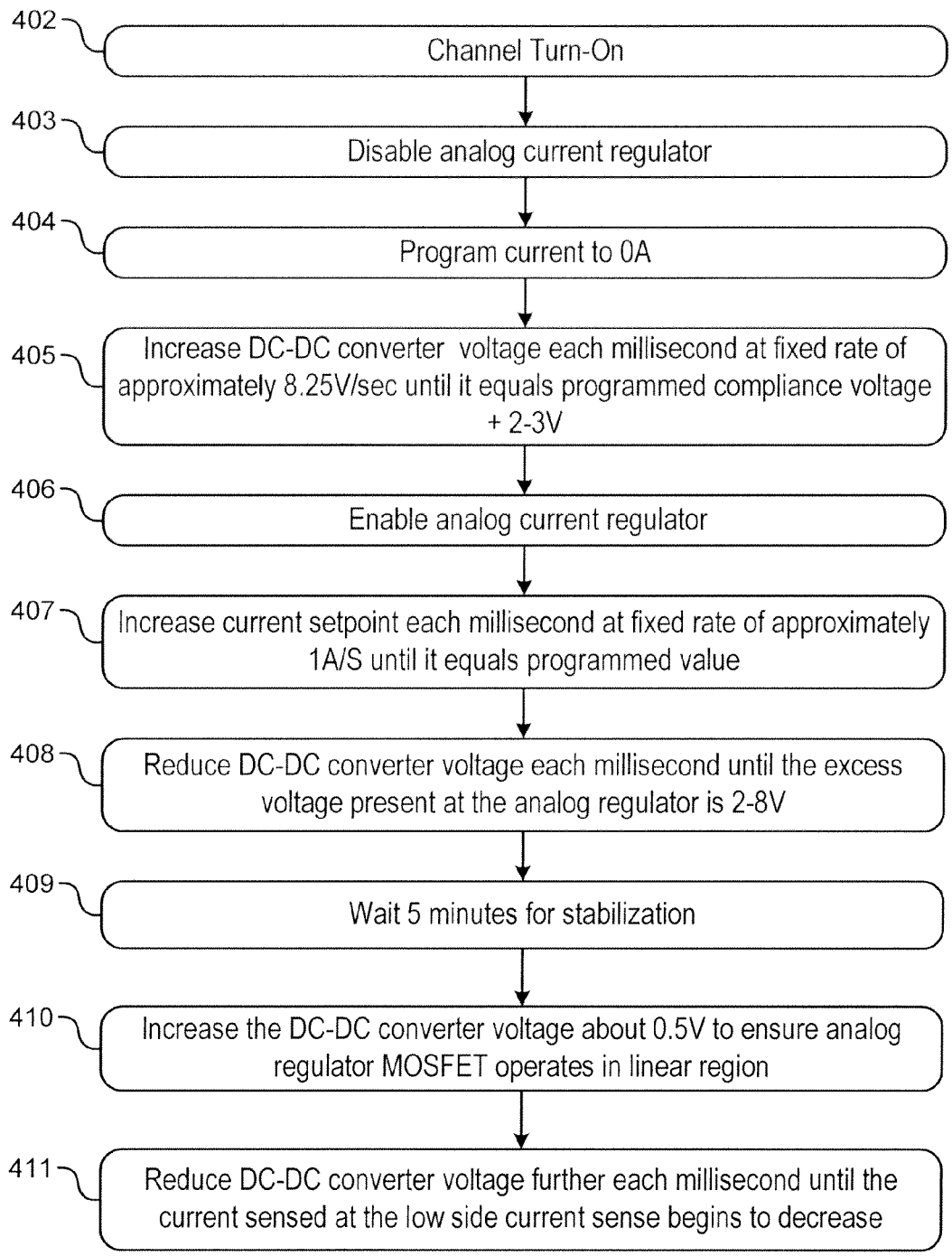
FIG. 4 illustrates a method of power plant start up implemented in accordance with an embodiment of the invention.

FIG. 4 illustrates a method of power plant start up implemented in accordance with an embodiment of the invention. Various aspects of the processor 301 will be described with respect to this figure. In step 402, the current source is activated when the channel corresponding to the devices to be tested is activated. Initially in step 403, the current regulating switch 330 is disabled, preventing current from flowing during start up.

The processor 301 maintains a current level control value for implementing the current level control process 318. In step 404, the current level is set to 0 A. Then, in step 405, the processor 301 implements the DC-DC converter control process 313 to ramp the voltage to a predetermined level. In some embodiments the steady state compliance voltage for the converter 304 is predetermined, or its value may be pre-estimated. In one embodiment, in step 405, the processor controls 313 the DC-DC converter 304 to increase the voltage each millisecond at a fixed rate of approximately 8.25V/sec until the voltage equals the predetermined or estimated compliance voltage plus between 2 and 3 V.

During this step 405, the processor 301 implements the leakage detection process 315. During the leakage detection process 315, the processor 301 monitors the outbound current using module 306. During normal circumstances, no current is detected from module 306 because switch 330 is open. Current being detected indicates a wiring fault. If a wiring fault is detected, the processor 301 controls 313 the converter 304 to shut down and a leakage fault is reported using fault reporting process 317.

If no leakage was detected, then in step 406 the current regulating switch 330 is enabled and current begins to flow through the load circuit. During step 407, the processor 301 performs a start up shock control process 316. The shock control process 316 limits the current rise by increase the current level control 318 provided to the current level control driver 312 to a predetermined rate. In one embodiment, the current set point is increases each millisecond at a Fixed rate of approximately 1 A/s until equals the programmed operating value. The shock control process 316 serves provides some time for LEDs to reach thermal equilibrium. Internal LED structures typically have thermal time constants in the microseconds to milliseconds. The startup shock control 316 increases the current slowly over many hundreds of milliseconds providing time for heat to spread evenly through the LED package, and minimizing temperature-related mechanical stresses that might lead to failures.

During this step 407, the control current limit provided to the over current detection module 308 is also ramped up at a similar rate. In some embodiments, the threshold between the current limit and the actual current level may change during start up. For example, the threshold may be set closer to actual current level during start up.

Both during start-up step 407 and normal operation, the processor 301 performs current imbalance detection 319. The processor 301 monitors the outbound current from module 306 and the inbound current from module 310. If the currents are not equal, then current is flowing into the load circuit from an outside source or out of the load circuit to an outside sink. Either circumstance indicates a wiring fault and, if this occurs, the power plant is shut down and a fault is reported. Current sensing circuits, such as modules 306 and 310 may operate within certain error tolerances. These error tolerances may depend on current, voltage, or both. In one embodiment, the processor 301 uses a table of normal errors between the modules 306 and 310 to implement the process 319. If the current imbalance detected is greater than the normal possible error range between the modules 306 and 310 at the measure current level, then a fault is detected and indicated.

After the current is increased to the operating level at the completion of step 407, the processor 301 begins adaptive voltage limiting 314 in step 408. To perform adaptive voltage limiting 314, the processor 301 measures the voltage across the current regulator 330 to measure the excess voltage at the regulator 330. The DC-DC converter 313 is then controlled by reducing the maximum converter 313 voltage level until the excess voltage is at a predetermined level. In one embodiment, the excess voltage level is adjusted to be between 2-8V.

The processor 301 then waits for a predetermined amount of time to allow the load circuit to stabilize. In one embodiment, the processor 301 waits for approximately 5 min for stabilization.

In an embodiment employing a MOSFET as regulator 330, after stabilization, the processor 301 performs step 410 to increase the DC-DC converter 304 voltage to ensure that the MOSFET operates in the linear region. In one embodiment, the converter 304 voltage is raised about 0.5V.

In step 411, the power utilized by the current source is reduced by reducing converter 304 voltage a predetermined rate until the current sensed at the low side current monitor 310 begins to decrease. As soon as the processor 301 detects a slight decrease, the power reduction step 411 completes and normal operation commences. In one embodiment, the decrease is on the order of a few mA.

During normal operation the processor continues to perform adaptive voltage limiting 314. The adaptive voltage limiting process 314 controls the DC-DC converter 304 to set the maximum output voltage available at a predetermined voltage level above the steady state voltage for the load circuit. This prevents excess extra voltage from being applied to the load in the event of an open circuit, and limits the impact of transient voltage spikes. Even if an intermittent open fault occurs, little extra voltage is available at the regulator 330, so only a nominal current spike is produced.

Figure 5:
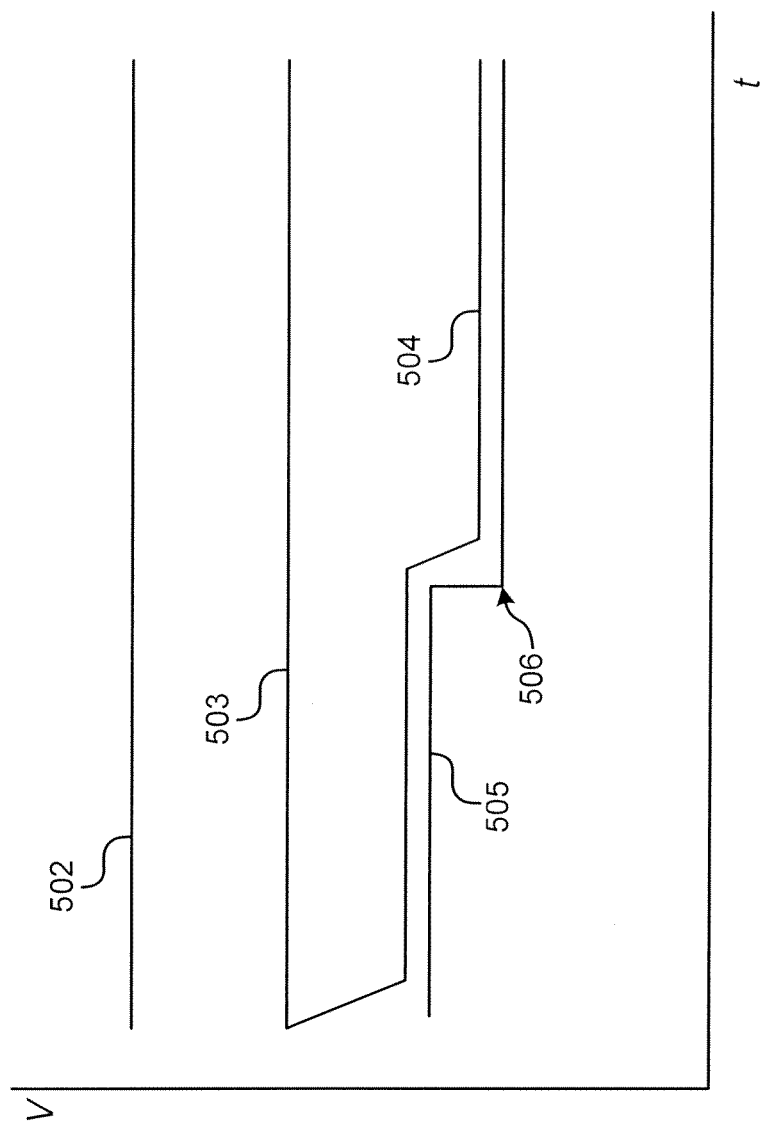
FIG. 5 illustrates an adaptive voltage limiting process during normal operation, implemented in accordance with an embodiment of the invention.

FIG. 5 illustrates the adaptive voltage limiting process 314 during normal operation. Limit 502 illustrates the source voltage compliance limit, which the converter 304 is incapable of exceeding. For example, the source limit may be 200V. Typical converters allow a compliance limit less than the source compliance limit to be programmed into the converter, such a limit is illustrated as line 503. For illustration, the programmed limit may be approximately 160V. Curve 505 illustrates the actual load voltage $V_f$. As illustrated, under a typical preprogrammed limit 503, a large headway between actual load voltage and limited voltage exists, providing increased potential for secondary fault damage. Under the adaptive voltage limiting process 314, the voltage for the converter 304 is limited to a predetermined number of volts above $V_f$ 504. After a fault 506, the circuit reaches a new steady-state voltage and the limit is again decreased.

The processor 301 further performs a voltage change rate (dV/dt) shutdown process This process 320 monitors the load voltage continuously in real time to determine its rate of change. This takes advantage of the fact that LEDs operating at constant current and temperature have very stable voltage drops, changing only a few millivolts over minutes or hours of operation. If processor 301 sees the load voltage change more quickly than the programmed threshold, it is a good indication that some fault exists within the LEDs in the load circuit, for example a short of a single internal diode in an LED array device. In such a fault, a portion of the LED current bypasses one or more of the junctions in the array. The re-routed current can eventually overstress and destroy other structures within the device, leading eventually to catastrophic failure. The dV/dt shutdown process 320 detects the voltage change caused by the re-routed current and shuts off current drive before further damage occurs. Failure analysis can then be performed on the damaged, but still working, device.

Figure 6:
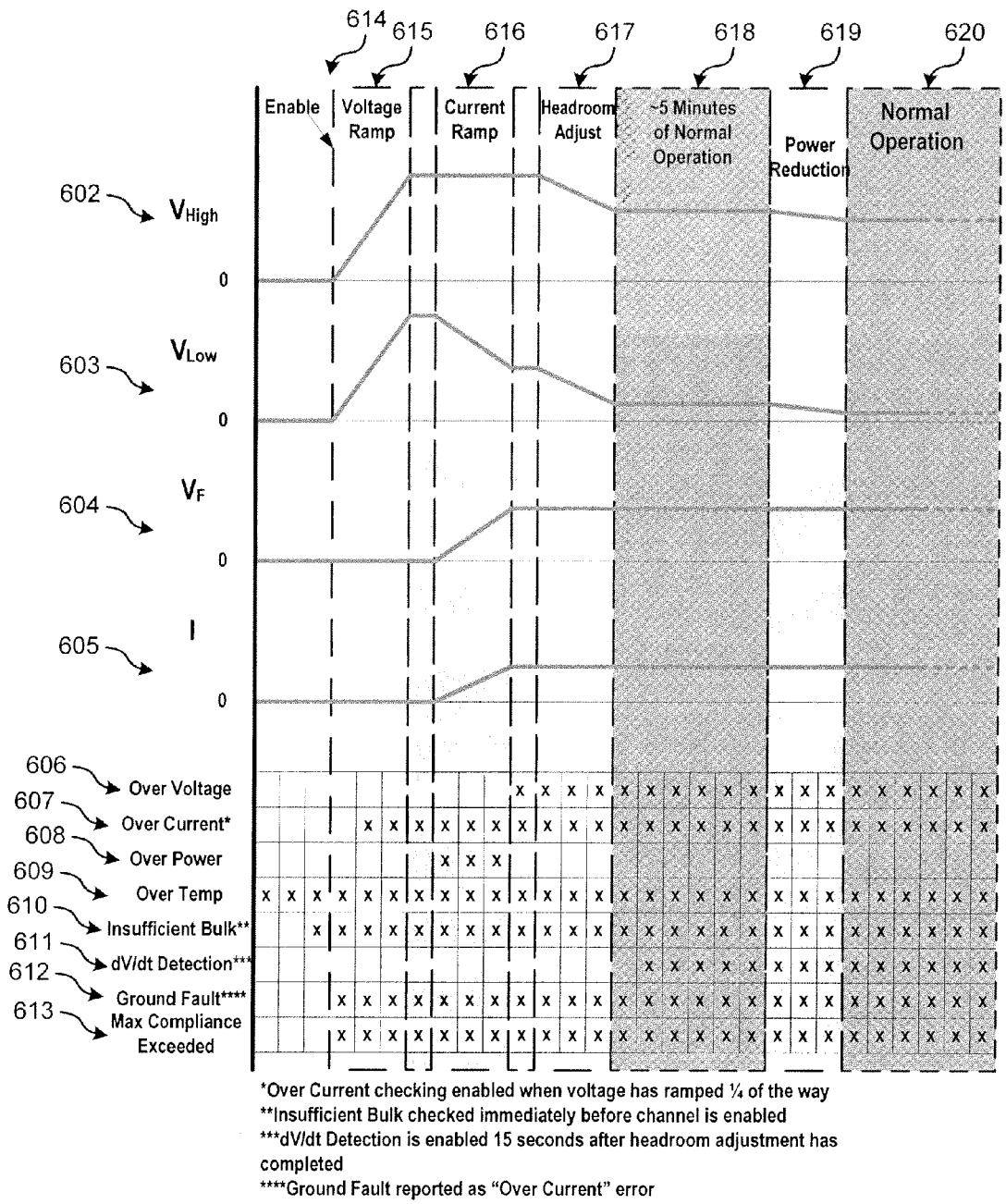
FIG. 6 is a timing diagram illustrating the startup process and normal operation of an embodiment of the invention.

FIG. 6 is a timing diagram illustrating the startup process and normal operation of an embodiment of the invention. In the diagram, curve 602 illustrates the $V_{high}$ voltage output by the current source. Curve 603 illustrates the $V_{low}$ voltage across the inbound current sense module 310 and regulator switch 330. Curve 604 illustrates the $V_F$ load circuit voltage. Finally, curve 605 illustrates the current through the load circuit. The normal startup and operation process comprises a voltage ramp phase 615, a current ramp phase 616, a headroom adjustment phase 617, a stabilization phase 618, a power reduction phase 619 and normal operation 620. The onset and duration of various monitoring procedures 606-613 are described below with respect to these operational phases.

Prior to beginning the testing process at point 614 (and throughout the test), temperature monitoring process 609 is run to detect temperatures outside of operating parameters. In one embodiment, process 609 is implemented by processor 301 using temperature sensors coupled to the power plant 300 or load circuit. Immediately prior to test commencement, the processor 301 activates the power failure detection module 303 to monitor bulk power 610. The bulk power monitoring 610 continues throughout the test.

After the channel is enabled 614 the start up procedure begins with a voltage ramp up phase 615. This phase is described in more detail above with respect to steps 402-405 of FIG. 4. At the onset of the voltage ramp phase 615, the converter 304 is activated, starting the converter's maximum compliance monitoring process 614. The As discussed above, DC-DC converters may have a built-in or preprogrammed maximum converter compliance voltage. If this voltage is exceeded, the converter 304 reports a fault to processor 301. Ground fault detection process 612 also commences with the initiation of the voltage ramp up phase 615. As described above, ground faults may be detected by measuring inbound and outbound current.

The over current process 607 begins during the voltage ramp phase 615. As described above, the over current process 607 includes ramping the over current threshold at approximately the same rate as the voltage. In one embodiment, this process occurs some time after the onset of phase 615, such as after the voltage has ramped to 25% of maximum. This avoids the requirement of determining over current thresholds for the period when the voltage is too low for significant secondary damage.

After the voltage ramp phase 615, the current ramp phase 616 commences. This phase is described in more detail above with respect to steps 406 and 407 of FIG. 4. During the current ramp phase 616, the processor 301 monitors the power used by the load circuit. If this power exceeds a predetermined threshold, the processor 301 registers a fault. At the end of the current ramp phase 616, the processor begins voltage monitoring 606. If the voltage across the load circuit exceeds a predetermined threshold, the voltage monitoring process 606 signals a fault.

The headroom adjust phase 617 follows the current ramp phase 616 and described above with respect to step 408 of FIG. 4. After the headroom adjust phase 617, the processor conducts a stabilization phase 618. In the illustrated embodiment, this phase is conducted for approximately 5 min before normal operation. During this phase, the processor 301 begins dV/dt detection 320, as described above. In some embodiments, this activation occurs after the commencement of the stabilization phase 618. In one embodiment, the dV/dT detection 611 begins after 15 seconds. The power reduction phase 619 is described above with respect to steps 410 and 411 of FIG. 5. After the power reduction phase 619, the system commences normal operation 620.

Figure 7:
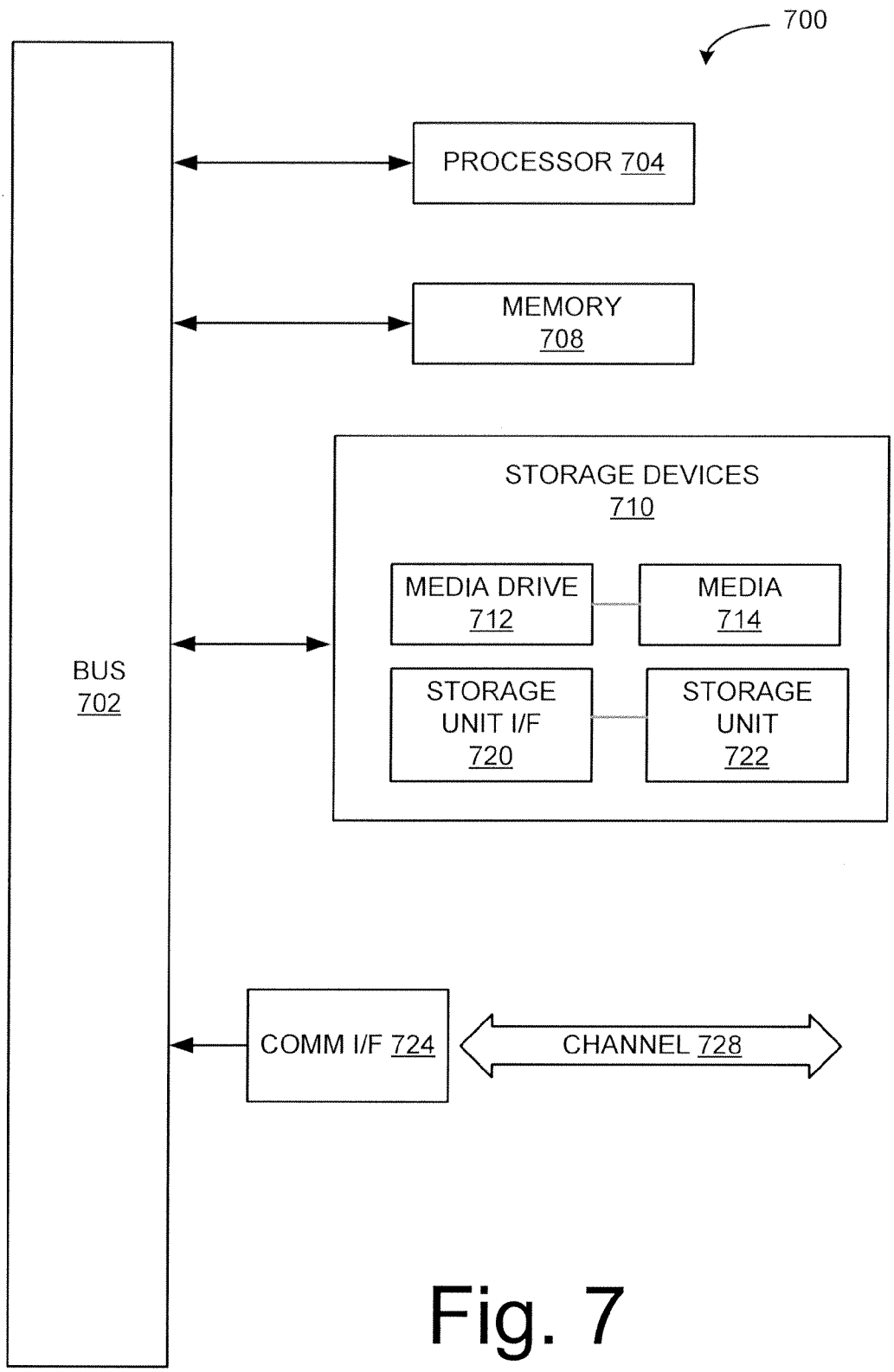
FIG. 7 illustrates an example computing module that may be used in implementing various features of embodiments of the invention.

As used herein, the term module might describe a given unit of functionality that can be performed in accordance with one or more embodiments of the present invention. As used herein, a module might be implemented utilizing any form of hardware, software, or a combination thereof. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example computing module is shown in FIG. 7. Various embodiments are described in terms this example-computing module 700. After reading this description, it will become apparent a person skilled in the relevant art how to implement the invention using other computing modules or architectures.

Referring now to FIG. 7, computing module 700 may for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 700 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 700 might include, for example, one or more processors, controllers, control modules, or other processing devices, such as a processor 704. Processor 704 might be implemented using a general-purpose or special-purpose processing engine such as, for example, a microprocessor, controller, or other control logic. In the illustrated example, processor 704 is connected to a bus 702, although any communication medium can be used to facilitate interaction with other components of computing module 700 or to communicate externally.

Computing module 700 might also include one or more memory modules, simply referred to herein as main memory 708. For example, preferably random access memory (RAM) or other dynamic memory, might be used for storing information and instructions to be executed by processor 704. Main memory 708 might also be used for storing temporary variables or other intermediate information during execution of instructions to be executed by processor 704. Computing module 700 might likewise include a read only memory ("ROM") or other static storage device coupled to bus 702 for storing static information and instructions for processor 704.

The computing module 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a floppy disk drive, a magnetic tape drive, an optical disk drive, a CD or DVD drive (R or RW), or other removable or fixed media drive might be provided. Accordingly, storage media 714 might include, for example, a hard disk, a floppy disk, magnetic tape, cartridge, optical disk, a CD or DVD, or other fixed or removable medium that is read by, written to or accessed by media drive 712. As these examples illustrate, the storage media 714 can include a computer usable storage medium having stored therein computer software or data.

In alternative embodiments, information storage mechanism 710 might include other similar instrumentalities for allowing computer programs or other instructions or data to be loaded into computing module 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory module) and memory slot, a PCMCIA slot and card and other fixed or removable storage units 722 and interfaces 720 that allow software and data to be transferred from the storage unit 722 to computing module 700.

Computing module 700 might also include a communications interface 724. Communications interface 724 might be used to allow software and data to be transferred between computing module 700 and external devices. Examples of communications interface 724 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 724 might typically be carried on signals, which can be electronic, electromagnetic (which includes optical) or other signals capable of being exchanged by a given communications interface 724. These signals might be provided to communications interface 724 via a channel 728. This channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 708, storage unit 720, media 714, and channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 700 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning, "at least one," "one or more" the like; and adjectives such as "conventional,"

"traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A fault protected current source, comprising:
   a positive current output and a negative current output configured to provide an operating current and operating voltage to a load;
   a DC-DC converter configured to receive a control signal from a processor and to adjust an output voltage of the current source in response to the control signal;
   an over current detection module configured to monitor current through the positive or negative current output and to compare the current to a control current indicated by a current level control signal provided by the processor; and
   the processor configured to monitor voltage across the positive current output and the negative current output to determine a steady state voltage across the load and to provide the control signal to the DC-DC converter to set the output voltage at a predetermined voltage level above the steady state voltage, and further configured to provide the current level control signal to the over current detection module.

2. The current source of claim 1, further comprising a current cutoff configured to control current through one of the positive current output or the negative current output, and to cut off the current in response to a control signal received from the over current detection module.

3. The current source of claim 2, further comprising a second current cutoff controlling current through the other one of the positive current output or the negative current output, configured to cut off the current in response to the control signal received from the over current detection module.

4. The current source of claim 2, wherein the processor is configured to measure a rate of change of voltage across the positive current output and the negative current output and to provide a second control signal to the current cutoff to cut off the current.

5. The current source of claim 1, further comprising a current rate limiter in series with the DC-DC converter and configured to limit changes in the current to a predetermined rate of change.

6. The current source of claim 1, further comprising a current limiting circuit in series with the negative current output and configured to limit positive current to below a predetermined positive current threshold and to prevent negative current.

7. The current source of claim 1, wherein the processor is configured to provide the predetermined positive current threshold to the current limiting circuit, and wherein the processor is further configured to increase the predetermined positive current threshold from a first level to a second level during a startup operation.

8. The current source of claim 1, further comprising a power failure detection module coupled to the DC-DC converter and configured to sense an initiation of a power failure and to provide a control signal to the DC-DC converter to shut off the current.

9. The current source of claim 1, further comprising a communications interface coupled to the processor.

10. The current source of claim 9, wherein the processor is configured to detect a fault and report the fault via the communications interface.

11. The current source of claim 9, wherein the communications interface is configured to detect a communication link loss and to transmit a control signal to the processor to shut down the current if the communication link loss is detected.

12. The current source of claim 1, wherein the processor is configured measure a difference between current output through the positive current output and inbound through the negative current output and to detect a fault if the difference exceeds a predetermined value.

13. The current source of claim 1, wherein the processor is configured to perform start up operation, the start up operation comprising:
   disabling current from flowing through the negative current output;
   transmitting control signals to the DC-DC converter to increase the output voltage at a predetermined rate of increase until the output voltage exceeds the operating voltage by a predetermined amount; and
   enabling current to flow through the negative current output.

14. The current source of claim 13, wherein the start up operation further comprises, during the step of transmitting control signals to the DC-DC converter, measuring current through the positive current output and signaling a fault if current flows through the positive current output.

15. The current source of claim 13, wherein the start up operation further comprises:
   increasing a maximum output current for the current source from 0 A to a predetermined level at a predetermined rate; and
   reducing the output voltage until the current through the negative current output decreases.

16. A method of operating a current source, comprising:
   providing an operating current and operating voltage to a load through a positive current output and a negative current output;
   adjusting an output voltage of a DC-DC converter in response to a control signal from a processor received by the DC-DC converter;

an over current detection module monitoring the current through the positive or negative current output and comparing the current to a control current indicated by a current level control signal provided by the processor;

the processor monitoring voltage across the positive current output and the negative current output to determine a steady state voltage across the load and providing the control signal to the DC-DC converter to set the output voltage at a predetermined voltage level above the steady state voltage; and the processor providing the current level control signal to the over current detection module.

17. The method of claim 16, further comprising a current cutoff controlling current through one of the positive current output or the negative current output, and the current cutoff cutting off the current in response to a control signal received from the over current detection module.

18. The method of claim 17, further comprising a second current cutoff controlling current through the other one of the positive current output or the negative current output; and the second current cutoff cutting off the current in response to the control signal received from the over current detection module.

19. The method claim 17, further comprising the processor measuring a rate of change of voltage across the positive current output and the negative current output and providing a second control signal to the current cutoff to cut off the current.

20. The method of claim 16, further comprising a current rate limiter in series with the DC-DC converter limiting changes in the current to a predetermined rate of change.

21. The method of claim 16, further comprising a current limiting circuit in series with the negative current output limiting positive current to below a predetermined positive current threshold and preventing negative current.

22. The method of claim 16, further comprising the processor providing the predetermined positive current threshold to the current limiting circuit, and the processor increasing the predetermined positive current threshold from a first level to a second level during a startup operation.

23. The method of claim 16, further comprising a power failure detection module coupled to the DC-DC converter sensing an initiation of a power failure and providing a control signal to the DC-DC converter to shut off the current.

24. The method of claim 16, further comprising the processor detecting a fault and reporting the fault via a communications interface coupled to the processor.

25. The method of claim 16, further comprising the communications interface detecting a communication link loss and transmitting a control signal to the processor to shut down the current if the communication link loss is detected.

26. The method of claim 16, further comprising the processor is measuring a difference between current output through the positive current output and inbound through the negative current output and detecting a fault if the difference exceeds a predetermined value.

27. The method of claim 16, further comprising the processor performing, start up operation, the start up operation comprising:

disabling current from flowing through the negative current output;

transmitting control signals to the DC-DC converter to increase the output voltage at a predetermined rate of increase until the output voltage exceeds the operating voltage by a predetermined amount; and enabling current to flow through the negative current output.

28. The method of claim 17, wherein the start up operation further comprises, during the step of transmitting control signals to the DC-DC converter, measuring current through the positive current output and signaling a fault if current flows through the positive current output.

29. The method of claim 17, wherein the start up operation further comprises:

increasing a maximum output current for the current source from 0 A to a predetermined level at a predetermined rate; and reducing the output voltage until the current through the negative current output decreases.

* * * * *